(12) United States Patent
Saha et al.

(10) Patent No.: US 8,764,993 B2
(45) Date of Patent: Jul. 1, 2014

(54) SIOC MEMBRANES AND METHODS OF MAKING THE SAME

(75) Inventors: Atanu Saha, Bangalore (IN); Salil Mohan Joshi, Mumbai (IN); An-Ping Zhang, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 1638 days.

(21) Appl. No.: 12/061,969

(22) Filed: Apr. 3, 2008

(65) Prior Publication Data

US 2009/0252971 A1    Oct. 8, 2009

(51) Int. Cl.
C23F 1/00    (2006.01)

(52) U.S. Cl.
USPC ...... 216/2; 216/37; 216/67; 216/83; 438/778; 438/784; 438/787

(58) Field of Classification Search
USPC ............. 216/2, 37, 67, 83; 438/778, 784, 787
See application file for complete search history.

(56) References Cited

U.S. PATENT DOCUMENTS

| | | | |
|---|---|---|---|
| 4,849,379 A * | 7/1989 | McCormick | 501/20 |
| 5,599,624 A | 2/1997 | Prochazka | |
| 5,948,484 A | 9/1999 | Gudimenko et al. | |
| 6,054,379 A * | 4/2000 | Yau et al. | 438/623 |
| 6,159,871 A | 12/2000 | Loboda et al. | |
| 6,271,273 B1 | 8/2001 | You et al. | |
| 6,313,518 B1 | 11/2001 | Ahn et al. | |
| 6,593,251 B2 * | 7/2003 | Baklanov et al. | 438/778 |
| 2004/0040653 A1 | 3/2004 | Nuzzo et al. | |
| 2006/0127307 A1 | 6/2006 | Canham | |
| 2007/0020918 A1 | 1/2007 | Hirokawa et al. | |
| 2007/0269411 A1 | 11/2007 | Sun et al. | |
| 2008/0145998 A1 * | 6/2008 | Delgadino et al. | 438/401 |
| 2008/0157390 A1 * | 7/2008 | Hwang | 257/774 |

FOREIGN PATENT DOCUMENTS

WO    WO9011582    10/1990

OTHER PUBLICATIONS

Z. Li et al.; "Preparation of thermostable amorphous Si-C-O membrane and its application to gas separation at elevated temperature"; Journal of Membrane Science 118 (1996) 159-168.

Saha et al.;"A Model for the Nanodomains in Polymer-Derived SiCO"; J. Am. Ceram. Soc., 89 [7] 2188-2195 (2006).

Pena-Alonso et al.; "Preparation of Ultrathin-Walled Carbon-Based Nanoporous Structures by Etching Pseudo-Amorphous Silicon Oxycarbide Ceramics"; J. Am. Ceram. Soc., 89 [8] 2473-2480 (2006).

Pena-Alonso et al., "Silicon-titanium Oxycarbide Glasses as Bimodal Porous Inorganic Membranes", Journal of European Ceramic Society, vol. 27. N 2-3, 2007, pp. 969-973.

Lee et al, "A Hydrogen-Permselective Silicon Oxycarbide Membrane Derived from Polydimethylsilane", vol. 82, N 10, Oct. 1999, pp. 2796-2800.

* cited by examiner

Primary Examiner — Nadine Norton
Assistant Examiner — Maki Angadi
(74) Attorney, Agent, or Firm — Jenifer Haecki

(57) ABSTRACT

A method of making a porous SiOC membrane is provided. The method comprises disposing a SiOC layer on a porous substrate, and etching the SiOC layer to form through pores in the SiOC layer. A porous SiOC membrane having a network of pores extending through a thickness of the membrane is provided.

20 Claims, 5 Drawing Sheets

SIOC MEMBRANES AND METHODS OF MAKING THE SAME

BACKGROUND

The invention relates to separation of fluids, and more particularly to SiOC membranes and methods of making the same.

Polymer derived ceramics (PDCs) membranes possess excellent thermal and chemical stability and can be used under critical process conditions where most of the polymeric membranes are unstable. PDCs have mainly two families: one is made of silicon, oxygen and carbon, commonly known as silicon oxycarbide (SiOC); while the other one is made of silicon, carbon and nitrogen, known as silicon carbonitride. Varieties of PDCs with multifunctional properties have evolved from these two families by adding different dopants. The composition of PDCs is non-stoichiometric, in general, and that determines their structure.

PDCs are obtained from the pyrolysis of polymer precursor. There exists strong bonding between silicon and carbon in the polymer that prevents carbon from volatilizing as a hydrocarbon during pyrolysis. The polymer pyrolysis process is a low-temperature route for making high-temperature ceramics as the pyrolysis is completed below about 1200° C. In recent years, ternary PDC systems made from SiCN and SiCO have attracted interest because of their unusual properties, such as the absence of steady state creep, presence of visco-elasticity at very high temperatures, oxidation resistance, corrosion resistance and optical properties.

Due to these properties PDCs are a suitable candidate for forming membranes. However, in many applications a major concern in the processing of membranes is to achieve nanopores with narrow pore size distribution. Apart from narrow pore size distribution, membranes need to have chemical and mechanical stability for efficient separation process. For example, lack of porous membranes with uniform pore size distribution makes the separation of bio-molecules like viruses and proteins relatively difficult.

Therefore, it would be desirable to provide membranes, which have the desired pore size distribution and that exhibit chemical and mechanical stability.

BRIEF DESCRIPTION

In one embodiment, a method of making a porous SiOC membrane is provided. The method comprises disposing a SiOC layer on a porous substrate, and etching the SiOC layer using an etching agent to form through pores in the SiOC layer.

In another embodiment, a method of making a porous SiOC membrane is provided. The method comprises applying a SiOC layer on a porous substrate, and exposing the SiOC layer to a hydrofluoric acid ambient to form through pores in the SiOC layer.

In yet another embodiment, a method of making a porous SiOC membrane is provided. The method comprises applying a SiOC layer on a porous substrate, and forming through pores in the SiOC layer by at least partial removal of silica from a bulk of the SiOC layer.

In another embodiment, a porous SiOC membrane having a network of pores extending through a thickness of the membrane is provided.

In another embodiment, a membrane assembly is provided. The membrane assembly comprises a substrate, and a porous SiOC membrane disposed on the substrate, wherein the porous SiOC membrane comprises at least one through pore.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Described herein are porous membranes made of SiOC. As used herein, the term "SiOC" refers to a polymer derived ceramic (PDC) material comprising silicon, oxygen and carbon and other materials such as, but not limited to, nitrogen and hydrogen. Further, the SiOC may also include one or more p-type or n-type dopants. Suitable dopants include, but are not limited to, boron, aluminum, and nitrogen. SiOC may or may not be electrically conductive. As used herein, the term "through pores" refer to a single pore or a network of pores that extend through a bulk of a SiOC layer.

Figure 1:
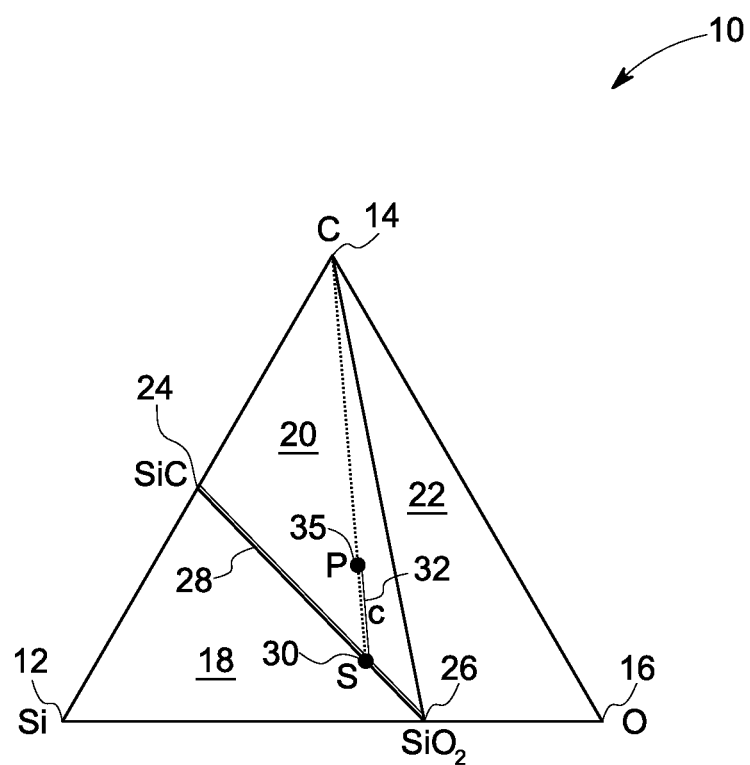
FIG. 1 is a ternary compositional diagram representing the SiOC composition.

FIG. 1 is a ternary compositional diagram for SiOC. The plot 10 illustrating atomic percentages of elements silicon 12, carbon 14 and oxygen 16 may be divided into compositional regions 18, 20 and 22. The vertices 12, 14 and 16 represent 100% silicon, 100% carbon, and 100% oxygen, respectively. The compositional region 18 comprises excess silicon, whereas the compositional region 20 comprises excess carbon, and the compositional region 22 comprises excess oxygen. The points 24 and 26 represent silicon carbide (SiC) and silica compositions ($SiO_2$), respectively. Stoichiometric SiOC composition falls on the tie-line 28 that connects silicon carbide 24 and silica 26 compositions. However, it is common to find materials that are a mixture of silica, silicon carbide and carbon, such materials are present in the region 20. The domain size of the silica domain is determined by the surface to volume ratio of the domains, and therefore depends on the composition of the point S represented by the reference numeral 30. For example, the domain size becomes smaller as the point S 30 moves closer to silicon carbide 24. The free carbon content represented by c 32 determines the carbon chemistry of the interdomain boundary. In the illustrated embodiment, the overall composition of the SiOC material is represented by P 35.

Figure 2:
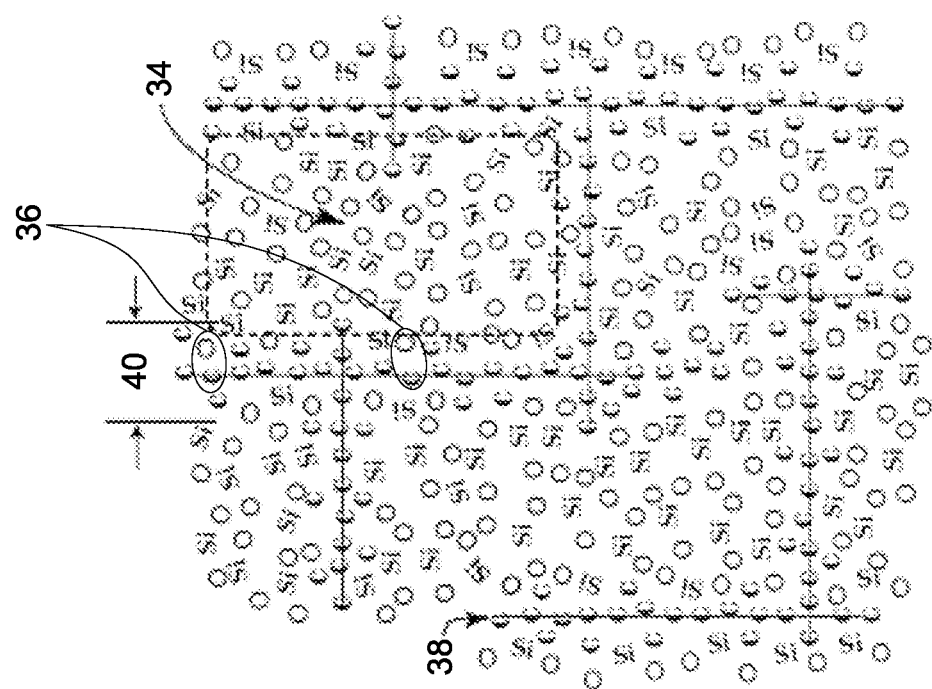

As illustrated in FIG. 2, amorphous SiOC is made of three different parts, silica tetrahedral or silica domains 34, oxycarbide units 36, and free graphitic carbon 38. In certain embodiments, the silica domain 34 may extend upto a few nanometers. The clusters of silica domains 34 are surrounded by domain wall 40 that consists of mixed bonds of oxycarbide units 36 and graphitic carbon 38. The oxycarbide units 36 in SiOC material are derivatives of silica tetrahedral where the oxygen atoms are replaced by carbon atoms and are represented by the formula $SiC_nO_{4-n}$. The structure or the building block of the SiOC consists of silica domain 34 surrounded by oxycarbide units 36. These silica domains 34 encapsulated with oxycarbide units 36 are separated by graphitic carbon sheets 38, which form a cage-like network. Typically, the size of the silica domains 34 as well as the thickness of the graphitic carbon sheets 38 is determined by the chemical composition of SiOC. The size of the silica domains 34 and the thickness of the graphitic carbon sheets 38 may be altered by changing the starting polymer precursors and processing parameters. Therefore, silica domain size 34, starting from 2-3 nm to several tens of nanometers can be made by choosing proper starting precursors and by varying process parameters.

Figure 3:
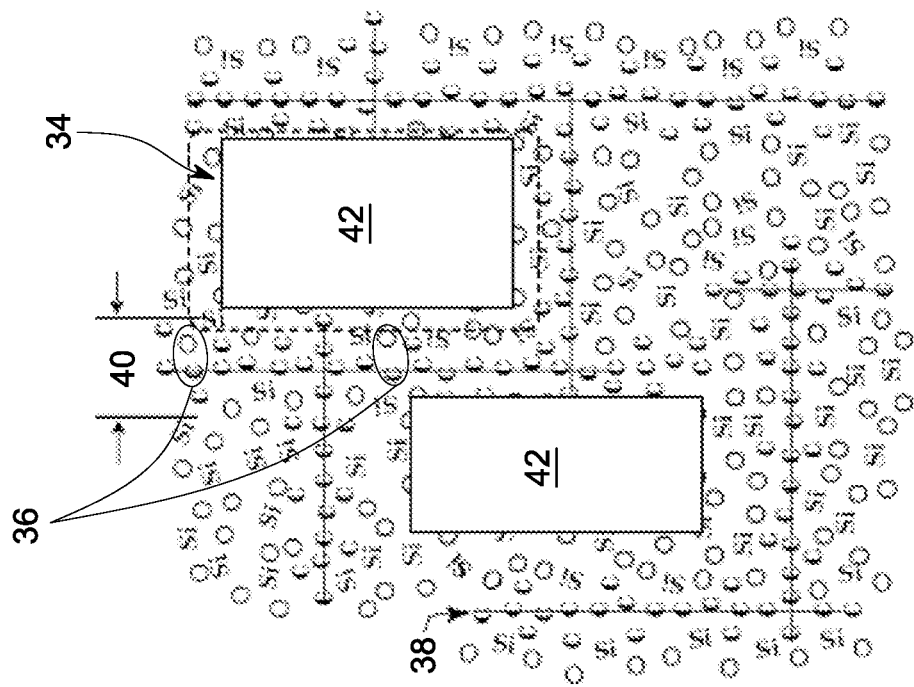
FIGS. 2 and 3 are schematic representations of SiOC structures before and after etching.

Out of these three constituents, both silicon oxycarbide units 36 and graphitic carbon 38 are resistant to hydrofluoric acid while silica domains 34 are susceptible to hydrofluoric acid. In the present technique, the structure of SiOC is utilized to make nanoporous SiOC membrane with uniform pore size. As illustrated in FIG. 3, at least a part 42 of the silica domains 34 is removed to obtain the porous SiOC structure. The pore size may be controlled by controlling the composition of SiOC, or etching conditions, or both.

Embodiments of the present technique disclose a method of making a porous SiOC membrane. The method of fabrication of the present technique provides an opportunity to control the pore size of the membrane. The tailoring of the pore size of the SiOC membrane is achieved by altering the composition of the starting polymer, processing parameters, and etching conditions. In certain embodiments, the pores are generated by chemical etching of silica from the nanodomains of silicon oxycarbide.

In certain embodiments, a method of making a SiOC membrane assembly comprises disposing a SiOC layer on a porous substrate. The SiOC layer may be formed separately and then disposed on the porous substrate. Alternatively, the SiOC layer may be formed directly onto the porous substrate. The porous substrate includes a material that is non-reactive with SiOC. Also, the porous substrate includes a material that may or may not have compatible thermal expansion with that of the SiOC layer. The porous substrate may include a ceramic substrate, a zirconia substrate, an alumina substrate, a silicon carbide substrate, a silicon nitride substrate, or combinations thereof. Further, in instances where the SiOC membrane is made separately and later disposed on the substrate, the substrate may be made of a porous polymeric material. The substrate may be chosen such that the average pore size of the substrate is greater than the average pore size of the SiOC membrane.

In some embodiments, the SiOC layer may be prepared using the sol-gel route. In these embodiments, the SiOC layer is prepared via hydrolysis and condensation of organically modified alkoxy silanes followed by the pyrolysis of the gel. In this process one or more precursors are mixed and diluted in solvent. Non-limiting examples of precursors include methyltrimethoxysilane, propyltrimethoxysilane, phenyltrimethoxysilane, or combinations thereof. Subsequently, water, is added for hydrolysis. In one embodiment, the molar ratio of water and silicon is about 4:1. Further, acid catalyst may be added to the solution to promote hydrolysis. In one embodiment, the solution thus formed is coated on a porous substrate and left for hydrolysis followed by condensation. The time needed for hydrolysis and condensation ranges from few minutes to several hours depending on the precursors. The hydrolyzed film is then pyrolyzed to convert the gel into ceramic.

In other embodiments, the SiOC layer may be prepared using the polymer pyrolysis route. In these embodiments, the SiOC layer is prepared by the cross-linking of thermoset polymers. In one example, the thermoset polymer includes different types of siloxanes, polycarbosilanes, or polydimethylsilane. The cross-linking is facilitated by the use of catalyst. Non-limiting examples of the catalyst include platinum containing polymeric catalyst, and dicumyl peroxide. The cross linked polymer is subsequently pyrolyzed to form SiOC. In one example, polydimethyl siloxane (PDMS) is used as a thermoset cross-linking polymer precursor with platinum catalyst. Since the viscosity of starting precursor (PDMS) is relatively high, in order to make thin film of SiOC on the substrate, PDMS precursor with cross-linking agent is diluted in xylene or hexane to lower the viscosity. The lower viscosity of the polymer solution facilitates thin coating of polymer on the substrate, thereby resulting in thin SiOC coating on the porous substrate after pyrolysis.

In certain embodiments, the SiOC layer is formed on a substrate, such as an alumina substrate. In one example, the alumina substrate is coated by dip coating in a polymer solution. The polymer solution includes a cross-linking thermoset polymer. Next, the coated substrate is heat-treated in air at a temperature in a range from about 150° C. to about 200° C. The heat treatment is carried out for a period of about 30 minutes to about 1 hour to cross link the coated polymer. Next, the heat-treated polymer is subjected to pyrolysis in an inert environment in a temperature range of about 600° C. to about 1200° C. In one example, the inert atmosphere may include argon, or nitrogen, or both. As will be appreciated, the cross linking or the heat treatment temperature range and the pyrolysis temperature range may vary depending on the selection of the polymer.

In certain embodiments, the SiOC layer may be deposited on the porous substrate by employing one or more of PECVD (plasma enhanced chemical vapor deposition), chemical vapor deposition, LPCVD (low pressure chemical vapor deposition), radio frequency (RF) sputtering and so forth. The thickness of the SiOC layer may be in a range from about 50 nm to about 500 nm, and preferably from about 50 nm to about 200 nm. In one embodiment, the thickness of the SiOC layer is about 100 nm.

Subsequent to depositing the SiOC layer on the porous substrate, the SiOC layer is made porous by at least partially removing silica tetrahedrals from the SiOC layer. The silica tetrahedrals are removed from the bulk of the SiOC layer forming a network of the pores throughout the thickness of the SiOC layer. Removal of the silica tetrahedrals leave behind a skeleton of carbon and oxycarbide units, with porosity derived from the removal of silica. Since the silica domain is generally uniform in size throughout the layer, the removal of silica tetrahedrals provides with narrow pore size distribution in the membranes.

In one embodiment, the silica tetrahedrals are chemically etched to form a network of pores. The etching agent may include greater than or equal to about 10 percent hydrofluoric acid dissolved in water. In one example, the etching agent comprises about 10 percent to about 50 percent, and preferably about 20 percent to about 50 percent of hydrofluoric acid dissolved in water. In one embodiment, the SiOC layer is exposed to a hydrofluoric acid ambient to form through pores in the SiOC layer.

In one embodiment, the etching is carried out at room temperature. The rate of etching may be increased by increasing the temperature. The etching is carried out at atmospheric pressure. Further, depending on the required pore density the etching is carried out for a time period in a range of about 1 minute to several hours. The average pore size tends to increase with the increase in concentration of the etching agent, etching time, or both.

Figure 4:
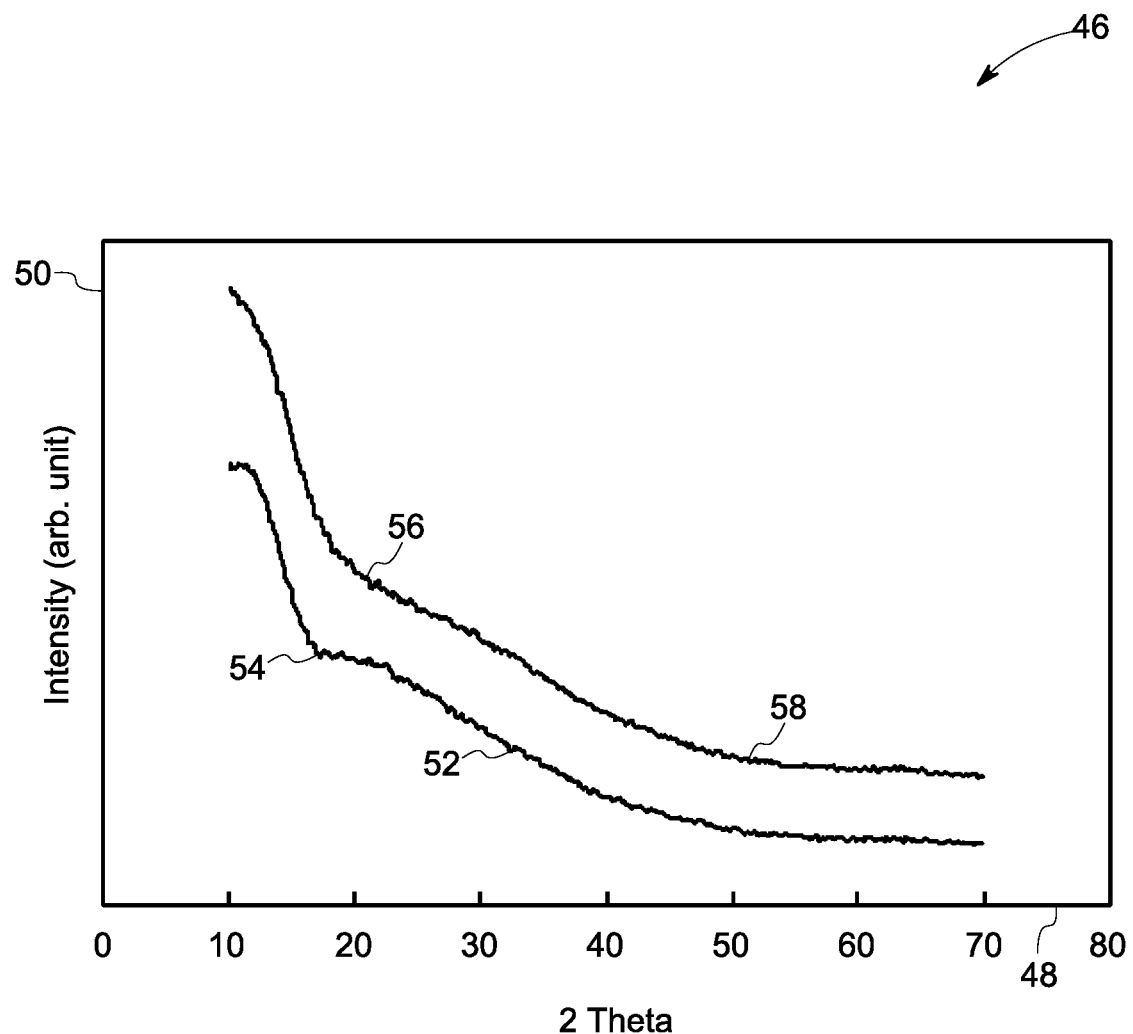
FIG. 4 is a graphical representation of an X-ray diffraction for etched and un-etched SiOC.

FIG. 4 illustrates an example of an X-ray diffraction pattern 46 for a SiOC material before and after partial removal of silica domains. In the illustrated embodiment, the abscissa 48 represents the angle of the diffraction pattern (2θ), and the ordinate 50 represents the intensity of the X-rays. The graph 52 represents SiOC that is not etched. The signature 54 of amorphous silica in the graph 52 is relatively more prominent as compared to the signature 56 of the silica for the SiOC 58, which is etched to at least partially remove silica domains. The removal or decrease in the signature of silica in the etched SiOC 58 confirms that the silica domains are at least partially removed from the SiOC.

Figure 5:
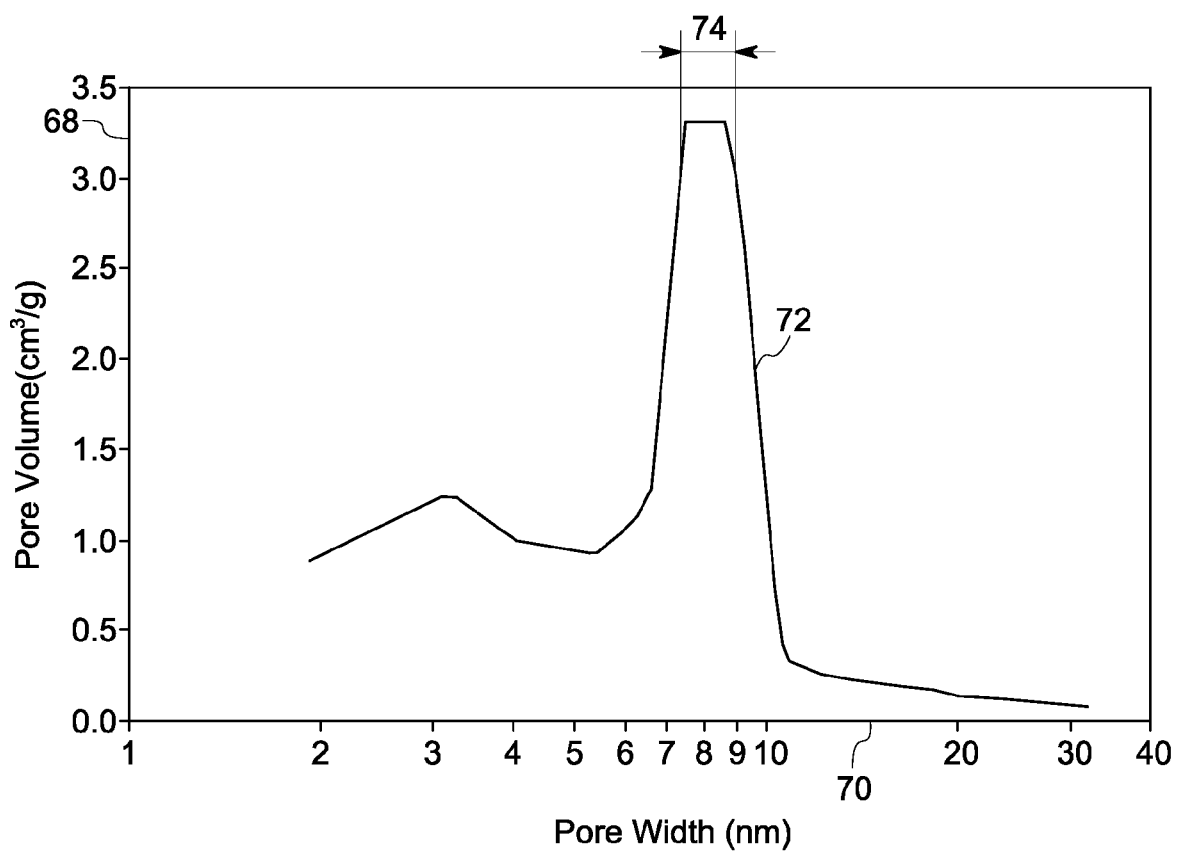
FIG. 5 is a graphical representation illustrating pore distribution for SiOC film.

FIG. 5 represents BET measurements for pore size distribution on a SiOC film. In the illustrated embodiment, the pore volume 68 is plotted with respect to the pore width 70. The plot 72 shows a narrow distribution of the pore width as evident from the peak 74 of the plot 72.

Figure 6:
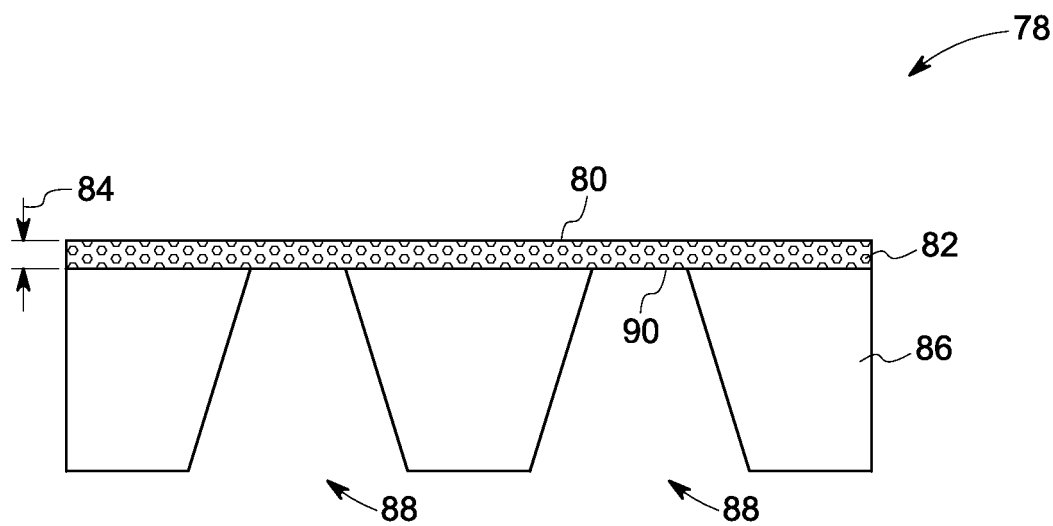
FIG. 6 is a cross-sectional view illustrating a membrane assembly having a patterned substrate.

FIG. 6 illustrates an example of a porous SiOC membrane assembly 78. The assembly 78 comprises a porous membrane 80 having a network of pores 82 extending through a thickness 84 of the membrane 80. The membrane 80 is supported on a patterned substrate 86. In the illustrated embodiment, the substrate 86 includes regions 88, such that in these regions 88 the membrane 80 is not coupled to the substrate 86. That is, the membrane 80 is exposed from the substrate side 90. In one embodiment, the regions 88 may be microfluidic channels. The substrate 86 may be patterned either before or after disposing the membrane 80 on the substrate 86. In embodiment where the substrate 86 is patterned before disposing the membrane 80 on the substrate 86, the pore size and/or the pore formation of the substrate 86 do not interfere with the pore formation in the layer having the SiOC membrane 80. In one embodiment, the patterned substrate 86 may contain holes or microfluidic channels to deliver the analyte or buffer solutions.

Figure 7:
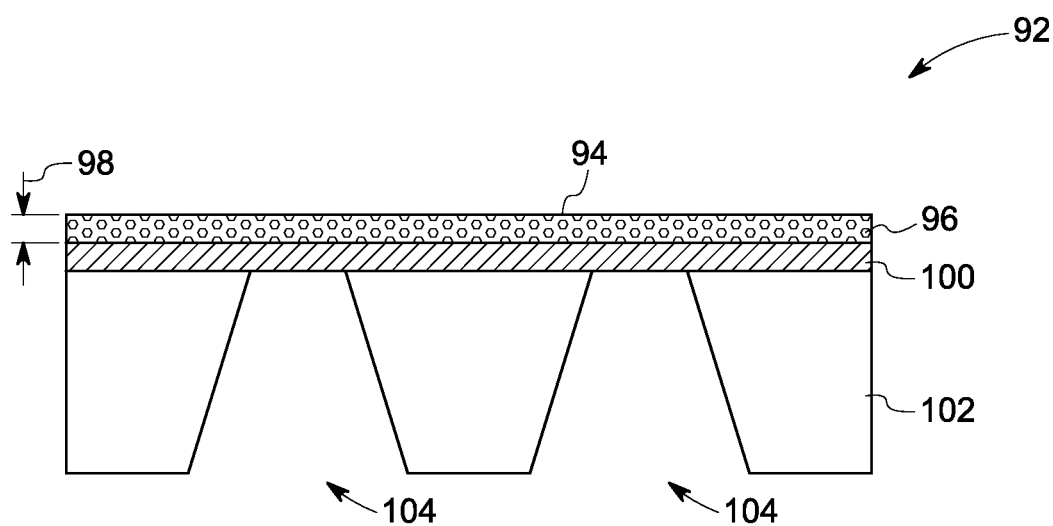
FIG. 7 is a cross-sectional view of an alternate embodiment of the membrane assembly of FIG. 6.

FIG. 7 is an alternate embodiment of the membrane assembly of FIG. 6. In the illustrated embodiment, the membrane assembly 92 includes a porous SiOC membrane 94 having a network of pores 96 extending through the thickness 98 of the membrane 94. The membrane 94 is disposed on an interfacial layer 100, the layer 100 in turn, is disposed on a patterned substrate 102 having regions 104 where the membrane 94 is exposed. The interfacial layer 100 may protect the SiOC membrane during the fabrication of the substrate 86. Non-limiting examples of the interfacial layer may include silicon dioxide, silicon nitride, and spin-on-glass.

The membrane assemblies 78 and 92 of FIGS. 6 and 7 respectively may be employed in on-chip, or inline applications where the membrane 86 is used for removing excess ions from the analyte or separating the bio-molecules based on their molecular weight or charges.

The SiOC membranes so prepared may be employed in separation processes. In separation processes, the pore size distribution and stability of membranes are critical factors for determining the efficiency of the process. SiOC exhibits excellent mechanical and thermo-mechanical properties, thus makes the membrane more durable. For example, the narrow pore size distribution and high mechanical stability facilitates efficient separation of bio molecules. In one example, selective separation of bio molecules such as proteins and viruses may be done using the SiOC membranes of the present technique that have narrow pore size distribution. In certain embodiments, the SiOC membrane has a pore size in a range of about 2 nm to several tenths of nanometers. In these embodiments, the pore size distribution is narrow. In one example, the pore size distribution is in a range from about 2 nm to about 15 nm. Also, the SiOC membranes exhibit mechanical and thermal stability to withstand relatively high-pressure differences needed for efficient separation processes. In one example, the SiOC membranes are adapted to withstand a pressure difference in a range from about 0.1 to about 1.5 atmospheric pressure.

In certain embodiments, SiOC is employed to fabricate high temperature membranes that are adapted to separate substances having sizes in the range from about 1 nm to 20 nm. In one example, the membrane is configured to filter fluids, both gas and liquid. Examples of fluids may include aromatic fluids, aliphatic fluids. Moreover, the pore size may be varied based on the requirements of the various applications where the SiOC may be employed. The membranes with average pore size of about 1 nm to about 2 nm may be used for separation of gaseous species. For example, when employed as a membrane to separate gaseous species, such as nitrogen, hydrogen, NOX sensors, the pore size of the SiOC membrane may be in a range from about 1 nm to about 2 nm. Whereas, higher pore size is required, when the SiOC membrane is applied as a separation membrane for the separation of bio-molecules. The pore size of the SiOC membrane may be in a range from about 2 nm to about 15 nm.

While only certain features of the invention have been illustrated and described herein, many modifications and changes will occur to those skilled in the art. It is, therefore, to be understood that the appended claims are intended to cover all such modifications and changes as fall within the scope of the invention.

The invention claimed is:

1. A method of making a porous SiOC membrane, comprising:
    forming a SiOC layer;
    disposing the SiOC layer on a porous substrate; and
    etching the SiOC layer using an etching agent to form through pores in the SiOC layer.

2. The method of claim 1, wherein the etching agent comprises greater than or equal to about 10 percent hydrofluoric acid dissolved in water.

3. The method of claim 1, wherein the etching agent comprises about 10 percent to about 50 percent hydrofluoric acid dissolved in water.

4. The method of claim 1, wherein a thickness of the SiOC layer is in a range from about 50 nm to about 500 nm.

5. The method of claim 1, wherein etching comprises at least partially removing silica from the SiOC layer.

6. The method of claim 5, wherein the silica is at least partially removed from a bulk of the SiOC layer.

7. The method of claim 1, wherein the etching occurs at room temperature.

8. The method of claim 1, wherein the etching is carried out for a time period in a rage of about 1 minute to about several hours.

9. The method of claim 1, wherein the substrate comprises a ceramic substrate, a zirconia substrate, an alumina substrate, a silicon carbide substrate, a silicon nitride substrate, or combinations thereof.

10. The method of claim 1, wherein a pore size distribution is in a range from about 1 nm to about 15 nm.

11. The method of claim 1, wherein a size of the pores is a function of the composition of the SiOC layer.

12. The method of claim 1, wherein an average pore size is varied by changing a time of etching, or a concentration of an etching agent, or both.

13. The method of claim 1, wherein the etching is carried out at ambient pressure.

14. The method of claim 1, wherein the membrane is electrically semiconductive.

15. The method of claim 1, further comprising doping the porous SiOC membrane.

16. The method of claim 1, wherein dopants comprise nitrogen, aluminum or boron.

17. The method of claim 1, comprising forming the SiOC layer by pyrolysis of methyltrimethoxysilane, propyltrimethoxysilane, phenyltrimethoxysilane, polycarbosilane, polydimethylsilane, polydimethylsiloxane, or combinations thereof.

18. A method of making a porous SiOC membrane, comprising:
   applying a SiOC layer on a porous substrate; and
   exposing the SiOC layer to a hydrofluoric acid ambient to form through pores in the SiOC layer.

19. A method of making a porous SiOC membrane, comprising:
   applying a SiOC layer on an interfacial layer disposed on a porous substrate; and
   forming through pores in the SiOC layer by at least partial removal of silica from a bulk of the SiOC layer.

20. The method of claim 19, wherein a chemical composition of the SiOC layer is altered during forming of the through pores in the SiOC layer.

* * * * *